United States Patent
One et al.

(10) Patent No.: US 11,235,414 B2
(45) Date of Patent: Feb. 1, 2022

(54) METHOD OF DETECTING AMOUNT OF DISCREPANCY IN ARC TRACKING WELDING

(71) Applicant: KOBE STEEL, LTD., Hyogo (JP)

(72) Inventors: Tsutomu One, Hyogo (JP); Yoshiharu Nishida, Hyogo (JP); Atsushi Fukunaga, Kanagawa (JP)

(73) Assignee: Kobe Steel, Ltd., Hyogo (JP)

( * ) Notice: Subject to any disclaimer, the term of this patent is extended or adjusted under 35 U.S.C. 154(b) by 405 days.

(21) Appl. No.: 16/349,213

(22) PCT Filed: Oct. 20, 2017

(86) PCT No.: PCT/JP2017/038085
§ 371 (c)(1),
(2) Date: May 10, 2019

(87) PCT Pub. No.: WO2018/092514
PCT Pub. Date: May 24, 2018

(65) Prior Publication Data
US 2019/0283167 A1   Sep. 19, 2019

(30) Foreign Application Priority Data

Nov. 16, 2016  (JP) .............................. JP2016-223233
Sep. 12, 2017  (JP) .............................. JP2017-174918

(51) Int. Cl.
*B23K 9/127*   (2006.01)
*B23K 9/12*    (2006.01)

(52) U.S. Cl.
CPC ................ *B23K 9/127* (2013.01); *B23K 9/12* (2013.01)

(58) Field of Classification Search
CPC ........ B23K 9/127; B23K 9/0956; B23K 9/12; B23K 9/1272; B23K 9/1276; B23K 31/125; B23K 9/0953
See application file for complete search history.

(56) References Cited

U.S. PATENT DOCUMENTS 4,417,126 A    11/1983  Kasahara et al.
4,556,777 A  * 12/1985  Sarugaku .............. B23K 9/127
                                                    219/124.34

(Continued)

FOREIGN PATENT DOCUMENTS

JP    S58-053375 A    3/1983
JP    S59-120369 A    7/1984

(Continued)

OTHER PUBLICATIONS

Machine translation of Japan Patent No. 61037376-A, Aug. 2021 (Year: 2021).*

(Continued)

*Primary Examiner* — Geoffrey S Evans
(74) *Attorney, Agent, or Firm* — Studebaker & Brackett PC

(57) ABSTRACT

In a method for detecting a deviation in arc-tracking welding, a deviation between a welding line and an actual welding position is detected in arc-tracking welding for performing welding tracking the welding line while performing a weaving operation of swinging a welding torch with respect to a welding direction. The method includes fitting a waveform expressed by a function repeated periodically in a period equal to a weaving period to a waveform of a welding current or a welding voltage and detecting a deviation in arc-tracking welding based on a fitted waveform.

6 Claims, 13 Drawing Sheets

(56) References Cited

U.S. PATENT DOCUMENTS

| | | | | |
|---|---|---|---|---|
| 4,633,059 A | * | 12/1986 | Sarugaku | B23K 9/0216 |
| | | | | 219/124.22 |
| 4,906,814 A | * | 3/1990 | Toyoda | B23K 9/127 |
| | | | | 219/121.34 |
| 7,999,208 B2 | * | 8/2011 | Shigeyoshi | B23K 9/1272 |
| | | | | 219/125.12 |
| 2005/0103766 A1 | * | 5/2005 | Iizuka | B23K 9/1274 |
| | | | | 219/124.34 |
| 2013/0299475 A1 | * | 11/2013 | Aoki | B23K 9/0953 |
| | | | | 219/124.03 |

FOREIGN PATENT DOCUMENTS

| | | | | |
|---|---|---|---|---|
| JP | S59-183971 A | | 10/1984 | |
| JP | 61037376 A | * | 2/1986 | ........... B23K 9/1272 |
| JP | 61144272 A | * | 7/1986 | ........... B23K 9/1272 |
| JP | H08-029255 A | | 2/1996 | |
| JP | 2004-098162 A | | 4/2004 | |

OTHER PUBLICATIONS

Machine translation of Japan Patent No. 61144272-A, Aug. 2021 (Year: 2021).*

The extended European search report issued by the European Patent Office dated Nov. 12, 2020, which corresponds to European Patent Application No. 17870900.2-1016 and is related to U.S. Appl. No. 16/349,213.

International Search Report issued in PCT/JP2017/038085; dated Nov. 14, 2017.

Written Opinion issued in PCT/JP2017/038085; dated Nov. 14, 2017.

* cited by examiner

TWO SLIDING WINDOWS

FOUR SLIDING WINDOWS

EIGHT SLIDING WINDOWS

METHOD OF DETECTING AMOUNT OF DISCREPANCY IN ARC TRACKING WELDING

TECHNICAL FIELD

The present invention relates to a method for detecting a deviation in arc-tracking welding.

BACKGROUND ART

In arc welding, "arc-tracking" is used commonly in which a deviation of a wire tip position from a joining position of welding is detected on the basis of an electrical variation such as a welding current or a welding voltage and a welding line is followed automatically by correcting for the detected deviation. The arc-tracking is intended to prevent occurrence of welding detects and increase the ratio of automation by detecting and correcting for a deviation of the target position of a welding torch due to a target work setting error, a working error, deformation during working, etc.

The above principle of arc-tracking is explained below. That is, the principle utilizes the fact that the welding current or welding voltage varies according to a variation of the projection length of a welding wire (more correctly, a distance from a torch power supply position to a base material), so as to detect a deviation of the torch target position on the basis of asymmetry of an arc current waveform or an arc voltage waveform during a weaving operation. The detected deviation is fed back to an automatic welding apparatus or a welding robot system and a correction is made in such a direction that the deviation of the torch tip position from a welding line is canceled out. The welding line is automatically followed in this manner.

It has been known that the following problem occurs in the aforementioned arc-tracking. For example, in actual welding, a robot operation locus (tracking locus) during the welding may vary in accordance with welding conditions (current, voltage, welding rate, weaving width, and weaving frequency) and tracking parameters (gain, and offset of difference between left and right currents).

That is, during actual welding, a deviation from a welding line may occur due to various factors.

The following Patent Documents 1 and 2 disclose techniques intended to solve such a problem that may occur during arc-tracking welding.

Patent Document 1 discloses a consumable electrode type arc welding method in consumable electrode type arc welding for performing welding tracking a welding line while weaving a welding torch in a left-right direction, including the steps of: detecting a current value at a weaving left end portion in a rightward weaving period when the welding torch is weaved from left to right, and then detecting a welding current minimum value in the rightward weaving period; detecting a current value at a weaving right end portion in a leftward weaving period when the welding torch is weaved from right to left, and then detecting a welding current minimum value in the leftward weaving period; then comparing a differential current value between the current values detected in the rightward weaving period and a differential current value between the current values detected in the leftward weaving period by arithmetic operation on the two differential current values; and controlling movement of a weaving width center position of the welding torch in accordance with a deviation between the two differential current values.

Patent Document 2 discloses a welding line tracking control method for performing welding while tracking a welding line by correcting a position of a welding torch relative to the welding line based on electrical time series data detected while weaving the welding torch periodically, the welding line tracking control method including the steps of: storing the electrical time series data associated with positions of the welding line and the welding torch as reference data in advance; upon execution of actual welding, obtaining a correlation coefficient between current electrical time series data and the reference data; and the position of the welding torch is corrected to increase the correlation coefficient.

BACKGROUND ART DOCUMENTS

Patent Documents

Patent Document 1: JP-A-58-53375
Patent Document 2: JP-A-2004-98162

SUMMARY OF THE INVENTION

Problem that the Invention is to Solve

The aforementioned Patent Documents 1 and 2 disclose various techniques. However, the techniques are insufficient to solve the problem intended by the present application.

For example, according to the technique in Patent Document 1, a center position of weaving can correctly track a welding line on the basis of differential current values between maximum current values and minimum current values at right and left ends during the weaving. However, the technique uses information of only four points in one period of weaving, and those values are added or subtracted simply. Therefore, the influence of a variation may be increased.

According to the technique in Patent Document 2, a welding current is acquired for each deviation in advance, and a correlation coefficient is calculated to perform tracking of a welding line. However, in this technique, it is necessary to perform welding for each deviation in advance to acquire data. Thus, it is necessary to acquire a huge amount of data in accordance with the number of combinations of welding conditions (welding current set values, welding voltage set values, weaving widths, weaving frequencies, and welding rates). In addition, the accuracy of tracking changes in accordance with a pitch width of deviations with which the data should be acquired in advance. Therefore, when high accuracy is required, there is a drawback that a welding current has to be acquired many times for deviations with a small pitch width.

That is, sufficient information cannot be acquired only by checking the difference in welding current value between the left and right ends of a weaving operation. Thus, it is difficult to perform proper control (control for preventing deviation from a welding line). In addition, the accuracy of arc-tracking has a close relationship to welding conditions. Therefore, if the accuracy of arc-tracking can be improved by some kind of method, the selectable range of the welding conditions (the tolerance of the welding conditions) can be widened.

In order to perform such control with high accuracy, it is essential to improve the computing power of a CPU or to improve the communication speed or the synchronization accuracy. Currently those performances have been extremely improved so that the robot position and the welding current or voltage can be synchronized with high accuracy.

The present invention has been developed in consideration of the aforementioned situation. An object of the invention is to provide a method for detecting a deviation in arc-tracking welding, capable of accurately detecting a deviation from a welding line when arc-tracking welding is performed.

Means for Solving the Problem

In order to attain the foregoing object, a method for detecting a deviation in arc-tracking welding is provided with the following technical means.

That is, the method for detecting a deviation in arc-tracking welding according to the invention is a method for detecting a deviation in arc-tracking welding, in which a deviation between a welding line and an actual welding position is detected in arc-tracking welding for performing welding tracking the welding line while performing a weaving operation of swinging a welding torch with respect to a welding direction, the method including fitting a waveform expressed by a function repeated periodically in a period equal to a weaving period to a waveform of a welding current or a welding voltage and detecting a deviation in arc-tracking welding based on a fitted waveform.

Preferably, as the waveform expressed by the function, at least one of a sine wave and a cosine wave having a period equal to the weaving period may be used.

Preferably, as the waveform expressed by the function, at least one of a sine wave and a cosine wave having a period equal to the weaving period is used and at least one of a sine wave and a cosine wave having a period equal to half the weaving period may be used Preferably a weaving waveform may be used as the waveform expressed by the function.

Preferably in fitting the waveform expressed by the function to the waveform of the welding current or the welding voltage, acquired data of the welding current or the welding voltage is accumulated in a predetermined period of time and fitting may be performed using the accumulated data of the welding current or the welding voltage.

Preferably in fitting the waveform expressed by the function to the waveform of the welding current or the welding voltage, successive fitting may be performed using each acquired piece of data of the welding current or the welding voltage whenever the piece of data is acquired.

Preferably in fitting the waveform expressed by the function is fitted to the waveform of the welding current or the welding voltage, sequential fitting may be performed using, of acquired pieces of data of the welding current or the welding voltage, each piece corresponding to one past weaving period whenever the pieces of data are acquired.

Preferably an average of results of the sequential fitting may be calculated every predetermined period of time while the sequential fitting is performed.

Advantage of the Invention

By use of the method for detecting a deviation in arc-tracking welding according to the invention, it is possible to accurately detect a deviation from a welding line when arc-tracking welding is performed.

MODE FOR CARRYING OUT THE INVENTION

A method for detecting a deviation in arc-tracking welding according to an embodiment of the present invention is described below in detail with reference to the drawings.

Although the following description is directed to a case where an apparatus that performs a welding operation is an articulated welding robot that causes a welding torch to perform a swinging operation (weaving operation), this is just an example and the apparatus that performs a welding operation may be a dedicated automatic welding apparatus.

The arc-tracking welding method in the embodiment is, for example, applied to a vertical articulated robot system. The vertical articulated robot system is outlined below.

Figure 9A:
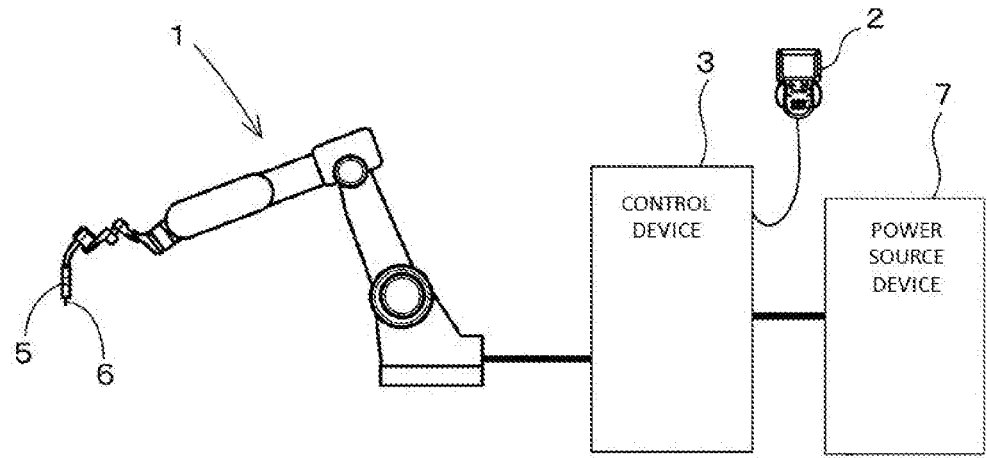
FIG. 9A is a schematic configuration diagram illustrating a configuration of a welding system.

As shown in FIG. 9A, for example, the vertical articulated robot system includes a welding robot 1, a control device 3 that is equipped with a teaching pendant 2, and a personal computer. The welding robot 1 is a vertical articulated 6-axis industrial robot and is equipped with, at a tip thereof, a welding tool including a welding torch 5 etc. The welding robot 1 may be mounted on a slider for moving the welding robot 1 itself.

The control device 3 controls the welding robot 1 according to a program about which the control device 3 has been taught in advance. The program is prepared using the teaching pendant 2 connected to the control device 3 or prepared using an offline teaching system utilizing the personal computer. The program prepared by the personal computer is delivered to the control device 3 via a storage medium or the like or transmitted to the control device 3 by data communication. The control device 3 is connected to a power source device 7 including a welding power source.

The personal computer, that is, the offline teaching system is equipped with a display that can display graphics, and a keyboard or a mouse as an input device. In addition, the personal computer is provided with a storage device or a communication device in order to import CAD information of a work.

The arc-tracking welding method in the embodiment is implemented in a form of a program provided in the control device 3.

The method for arc-tracking welding in the embodiment for performing welding tracking a welding line while performing a weaving operation for swinging the torch with respect to a welding direction is described below in detail.

Figure 9B:
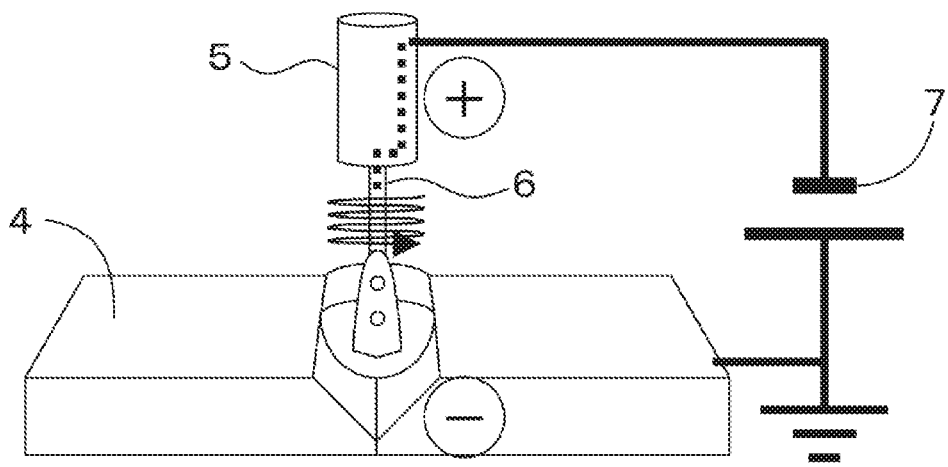
FIG. 9B is a schematic diagram illustrating the configuration of the welding system (torch portion).

First, FIG. 9B is a schematic diagram showing arc welding.

In the arc welding, the welding power source of the power source device 7 applies a voltage between a base material 4 and a welding wire 6 (consumable electrode) supplied from the welding torch 5, so as to generate an arc between the welding wire 6 and the base material 4. The welding is performed while the base material 4 and the welding wire 6 are melted by arc heat of the arc. Since the welding wire 6 melts down as the arc welding is performed, during the welding the welding wire 6 is continuously supplied from a supply device through the inside of the welding torch 5.

Welding metal produced by a molten portion of the base material 4 and the welding wire 6 solidifies to form a welding bead, whereby strong welding is attained. In welding between medium-thickness plates as typified by welding between thick steel plates, to obtain necessary strength of a welded portion, it is necessary to set the width of a welding bead to be large enough to secure a necessary amount of deposited metal and penetration depth. To this end, the welding between the medium-thickness plates is performed while an operation called weaving is performed to swing the welding torch 5 in the left-right direction. Thus, the width of the welding bead is increased to secure the necessary welding strength.

The welding torch 5 also supplies a shield gas, whereby an arc column formed at the tip of the welding torch 5 is protected from the air. Molten metal is also protected from the air by virtue of the presence of gas that is generated by decomposition of flux contained in the welding wire 6, whereby formation of welding defects such as a blow hole is suppressed.

On the other hand, in the field of welding with medium-thickness plates, it is not always the case where a welding line where welding should be performed is located at a determined position due to any of various reasons that, for example, the processing accuracy of a work to be welded is low, the setting accuracy of the work to be welded is low, and the work to be welded is deformed due to thermal strain during the welding. Deviation from the welding line is approximately on the order of several millimeters to centimeters.

However, from the viewpoint of welding quality, in general, the allowable deviation from the welding line in the arc welding robot 1 in the field of thick plates is smaller than 1 mm. Playback-type robots that perform welding at predetermined positions cannot attain such a level of welding quality. That is, in the welding robot 1 for medium-thickness plates, it is an essential condition to detect a deviation between a pre-taught welding position and a welding position of an actual work in real time and to perform "tracking" along a welding line on the sub-millimeter order so as to adapt to every detected deviation. This is one of indispensable and very important functions.

First Embodiment

When the aforementioned arc-tracking welding is performed, processing for detecting a deviation of a torch tip position with respect to a welding line is carried out inside a control portion according to this embodiment. Due to the processing for detecting a deviation as is described below, the deviation can be detected more accurately than in the background art. Thus, in the arc-tracking welding, it is possible to make control to reduce the deviation from the welding line as greatly as possible.

The details (processing (i) to processing (iv)) of the processing for detecting a deviation in arc-tracking welding according to the invention is described below. Specifically, the processing (i) to the processing (iv) which is described below are carried out in the processing for detecting a deviation in the embodiment.

Processing (i): A function repeated periodically in a period equal to a weaving period is fitted to a waveform of a welding current or a welding voltage, and a deviation in arc-tracking welding is detected based on a waveform of the fitted function. For example, a difference between a maximum value and a minimum value in the waveform of the fitted function is regarded as a current difference or a voltage difference corresponding to the deviation, and the deviation is obtained from the difference between the maximum value and the minimum value in the waveform of the function.

As for the function, a plurality of waveforms may be superimposed as long as the function is a function repeated periodically in a period equal to the weaving period. However, at least one waveform which always includes one local maximum value and one local minimum value is used. By use of such a function, the deviation may be obtained from the difference between the local maximum value and the local minimum value.

When the processing (i) is carried out, the deviation can be estimated using not only information of a left end point or a right end point of a weaving operation (a value of a welding current or a welding voltage when the welding torch 5 is located at a left end point or a right end point of a weaving waveform) but also information of each point during welding (a value of the welding current or the welding voltage when the welding torch 5 is located between the left end point and the right end point). Thus, the detection accuracy can be improved. In addition, the weaving waveform is known. It is therefore unnecessary to obtain a waveform for fitting as in Patent Document 2. That is, the weaving waveform is determined, and the function repeated periodically in a period equal to the weaving period is prepared, but it is not necessary to obtain a waveform for fitting by preliminary experiments or the like, or it is not necessary to acquire data required therefor.

In addition, as described previously, characteristics of the weaving waveform are known. Leftward and rightward swinging components in the weaving waveform can be also grasped in advance independently of the shape of the weaving waveform. Accordingly, fitting can be performed based on the shape of the leftward and rightward swinging waveform. Therefore, a range from which a maximum value or a minimum value should be taken needs not to determine bases on experiments on a nonlinear current waveform or voltage waveform varying continuously, as in a case where a maximum value or a minimum value of a current at a left end point or a right end point of a weaving operation is used as a background-art method as disclosed in Patent Document 1 or the like.

That is, in Patent Document 1 or the like, the performance of fitting depends largely on the range from which a maximum value or a minimum value should be taken. However, the number of possible combinations of welding conditions is so huge that it is difficult to select a proper range which can support all the combinations. On the other hand, according to the technique of the present invention, fitting work is performed every one period of weaving, but it is not necessary to select the range where a maximum value or a minimum value should be taken, in preliminary consideration of the huge possible combinations of welding conditions.

Typical MIG or MAG arc welding is performed using a constant-voltage power source. Therefore, a deviation from the center of a welding line appears in a current. On the other hand, TIG welding is performed using a constant-current power source. Therefore, a deviation from the center of a welding line appears in a voltage. Accordingly, it is preferable to fit the function to both the current and the voltage.

In addition, the welding current or the welding voltage contains a plenty of high frequency noise. It is preferable to fit the function to a waveform subjected to processing with an averaging filter or a low pass filter. However, since the fitting by the function has an effect as a filter, the function may be fitted directly to the welding current or the welding voltage.

Processing (ii): At least one of a sine wave and a cosine wave having a period equal to the weaving period may be used as the function used for performing the processing (i). Particularly, when fitting is performed with a function where both a sine wave and a cosine wave have been superimposed, there arises an advantage that, particularly due to a synthesis formula of trigonometric functions, it is not necessary to consider a phase difference during the fitting, that is, a phase difference between the welding current waveform and the position of the welding robot 1.

Processing (iii): At least one of a sine wave and a cosine wave having a period equal to the weaving period is used as the waveform of the function used for performing the processing (i), and at least one of a sine wave and a cosine wave having a period equal to half the weaving period is also used as the waveform of the function.

When a function consisting of not only a trigonometric function having a period equal to the weaving period but also a trigonometric function having a period equal to half the weaving period is used, fitting can be performed so that a waveform having half the period can be superimposed therein. Thus, the waveform of the welding current or the welding voltage can be fitted as a whole, so that the detection accuracy of the deviation can be improved.

Processing (iv): When the waveform of the function is fitted to the waveform of the welding current or the welding voltage in the processings (i) to (iii), sequential or successive fitting may be performed using each piece of acquired data of the welding current or welding voltage. In addition, the acquired data of the welding current or the welding voltage may be accumulated in a predetermined period of time so that fitting can be performed using the accumulated data of the welding current or the welding voltage.

As is described in the first half of Example 1, when the waveform of the function is fitted to the waveform of the welding current or the welding voltage, it is considered to accumulate the waveform of the welding current or the welding voltage corresponding to one period of weaving so that the waveform of the function can be fitted to the obtained waveform. In the processing on this occasion, fitting may be performed to be shifted by two periods, three periods or four periods of weaving.

On the other hand, as is described in the second half of Example 1, fitting processing (successive fitting processing) may be performed based on data of the welding current or the welding voltage obtained every control period. The weaving period is 2 to 10 Hz at the most. That is, arc-tracking can be corrected only at every 500 msec to 100 msec. On the other hand, when successive fitting work is performed, arc-tracking can be corrected every period with which the current or voltage of the welding power source 7 is acquired. That is, tracking can be corrected at every 1 msec to 10 msec, so that a smoother robot operation locus can be obtained during the arc-tracking. The processing (iv) is described in detail in Example 1.

When fitting cannot be attained in spite of the aforementioned processing (i) to processing (iv), it is determined that an abnormal state such as a too large deviation from the welding line occurs, and an abnormal signal is outputted.

Second Embodiment

Next, a method for detecting a deviation in arc-tracking welding according to a second embodiment is described.

In the processings (ii) and (iii) of the first embodiment, at least one of a sine wave and a cosine wave having a period equal to a weaving period or at least one of a sine wave and a cosine wave having a period equal to half the weaving period is used as a function for fitting work. On the other hand, in the method for detecting a deviation according to the second embodiment, fitting work is performed using a function (non-trigonometric function) other than any trigonometric function.

Figure 7:
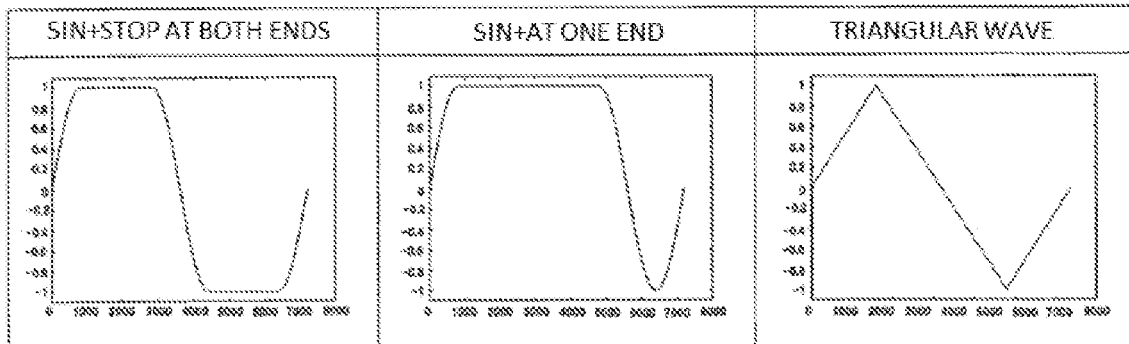
FIG. 7 is an explanatory diagram illustrating an example of a function to be used in a method of a second embodiment.

Each of functions illustrated in FIG. 7 by way of example may be used as such a non-trigonometric function.

For example, the function illustrated on the left of FIG. 7 has a waveform in which peaks of a sine wave have been cut off. The function is written as "Sin+stop at both ends" in FIG. 7. The function "Sin+stop at both ends" has a waveform in which, for example, of a sine wave or a cosine wave having a certain amplitude, any part where the value of the trigonometric function exceeds a predetermined value has been cut off.

In addition, the function illustrated on the central side of FIG. 7 has a waveform in which, of peaks of a sine wave or a cosine wave, only one on the maximum side or the minimum side has been eliminated. The function is written as "Sin+stop at one end" in FIG. 7. Also in the function, of a sine wave or a cosine wave, one component on the maximum side or the minimum side has been cut off.

Further, the function illustrated on the right side of FIG. 7 is a triangular wave. That is, the triangular wave has a repeated variation in which the value thereof decreases at a fixed decrease rate from the maximum value toward the minimum value, and increases at a fixed increase rate toward the maximum value after reaching the minimum value. Such a triangular wave may be used as the function. A rectangular wave may be used as the non-trigonometric function.

As described above, a function including a trigonometric function or a non-trigonometric function is fitted to the waveform of a welding current or a welding voltage, and a deviation in arc-tracking welding is detected based on the fitted waveform. Thus, a deviation from a welding line can be obtained.

Particularly when the weaving waveform is a waveform of a non-trigonometric function, the deviation can be detected by fitting to a trigonometric function having the same period as the weaving waveform, or the deviation can be detected by fitting to a waveform similar to the weaving waveform and having the same period as the weaving waveform.

EXAMPLES

Next, examples to which the technique of the invention is applied is described along the following Example 1 to Example 3.

Example 1

In Example 1, fitting using a sine wave is performed on a waveform of a welding current obtained every one period of weaving (matching between the welding current and the sine wave). To say other words, fitting is performed by processing in a least-squares method every one period of weaving, so as to detect a deviation from a welding line.

Specifically, a function y(t) for every one period of weaving can be expressed as Expression (1), where $p_1$ designates the amplitude of the sine waveform and $\phi$ designates the phase difference between the waveform of the welding current and the sine waveform.

[Math 1]

$$y(t)=p_1 \times \sin(t+\phi)+p_2 \quad (1)$$

That is, when the aforementioned Expression (1) is applied to n periods of weaving, n equations including coefficients $p_1$ and $p_2$ are obtained. The amplitude $p_1$ can be obtained by use of the least-squares method.

[Math 2]

$$\begin{bmatrix} y(t_1) \\ y(t_2) \\ \vdots \\ y(t_n) \end{bmatrix} = \begin{bmatrix} \sin(t_1+\phi) & 1 \\ \sin(t_2+\phi) & 1 \\ \vdots & \vdots \\ \sin(t_n+\phi) & 1 \end{bmatrix} \times \begin{bmatrix} p_1 \\ p_2 \end{bmatrix} \quad (t_1 < t_2 < \ldots < t_n)$$

can be obtained by $P=(A^T \times A)^{-1} \times A^T \times B$ on the assumption:

$$B = A \times P$$

Although a sine wave using a phase deviation as $\phi$ is used as the function in Expression (1), a function in which a sine wave and a cosine wave have been superimposed may be used instead of the phase deviation $\phi$ as shown in Expression (2).

[Math 3]

$$y(t)=q_s \times \sin(t)+q_c \times \cos(t)+p_2 \quad (2)$$

Amplitude qs of a sine wave component and amplitude qc of a cosine wave component in Expression (2) can be obtained by use of the least-squares method. After that, synthesized amplitude can be obtained by Expression (3) based on synthesis of trigonometric functions.

[Math 4]

$$p_1 = \sqrt{q_s^2 + q_c^2}$$

$$y(t)=p_1 \times \sin(t+\phi)+p_2 \quad (3)$$

That is, when fitting is performed using a trigonometric function where a sine wave and a cosine wave have been superimposed as the function, only a deviation from a welding line can be obtained without obtaining a phase difference.

Therefore, this technique has advantages such as it is not necessary to perform "phase matching between a welding current waveform and a robot position" casing a problem of giving a large change to accuracy when a deviation from a welding line is obtained in the background art, and there does not occur a problem that the accuracy of the deviation deteriorates due to insufficient phase matching.

When the amplitude $p_1$ of the function for one weaving period is obtained by the aforementioned Expression (1) to Expression (3), control is made to set the obtained amplitude $p_1$ to 0. Specifically as such control, control can be considered in which PI control or the like is carried out based on a value in which the amplitude $p_1$ or an integrated value of past amplitude $p_1$ is multiplied by a gain.

That is, in Patent Document 1, when "IL1" and "IL2" designate a maximum value and a minimum value on the left end side of the measured weaving current, and "IR1" and "IR2" designate a maximum value and a minimum value on the right end side of the same, a left-right current difference is expressed by (IL1−IL2)−(IR1−IR2). The amplitude $p_1$ can be treated as similar to the left-right current difference.

Figure 1:
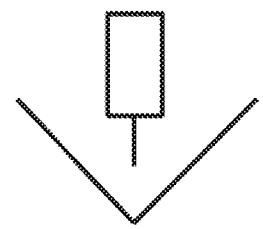
FIG. 1 is an explanatory diagram schematically illustrating downward welding.
Figure 2A:
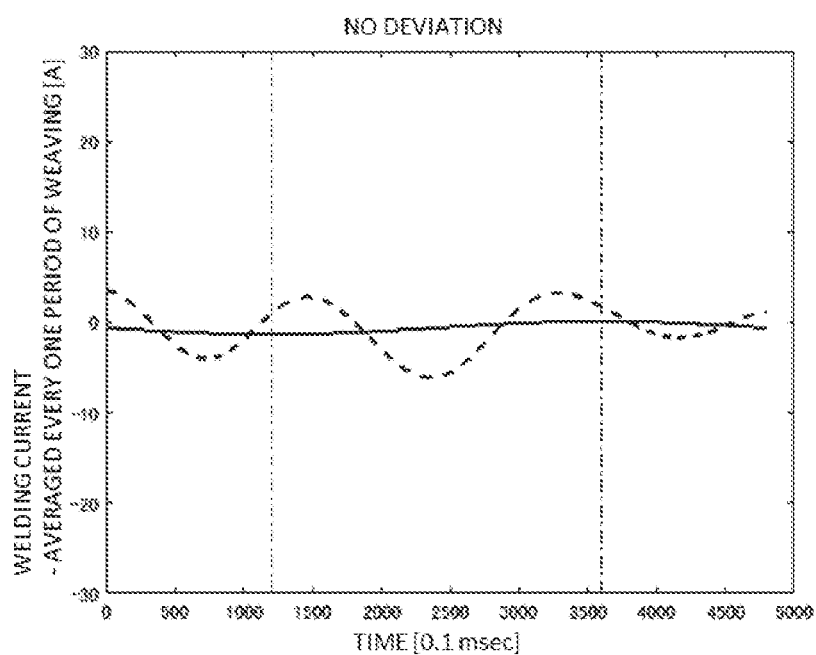
FIG. 2A is a graph illustrating a change in welding current when there is no deviation of a welding torch from a welding line during the welding of FIG. 1 (Example 1).
Figure 2B:
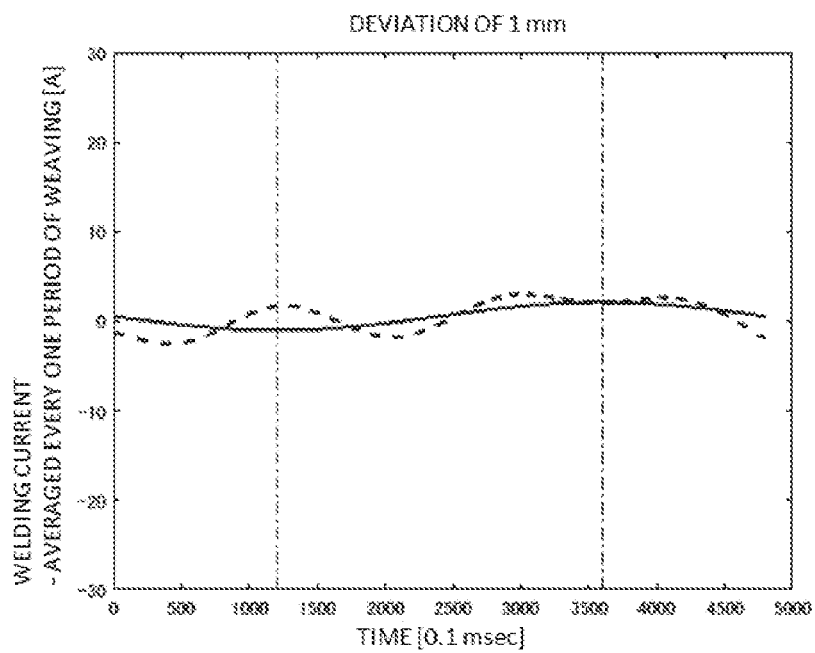
FIG. 2B is a graph illustrating a change in welding current when the deviation of the welding torch from the welding line is 1 mm during the welding of FIG. 1 (Example 1).
Figure 2C:
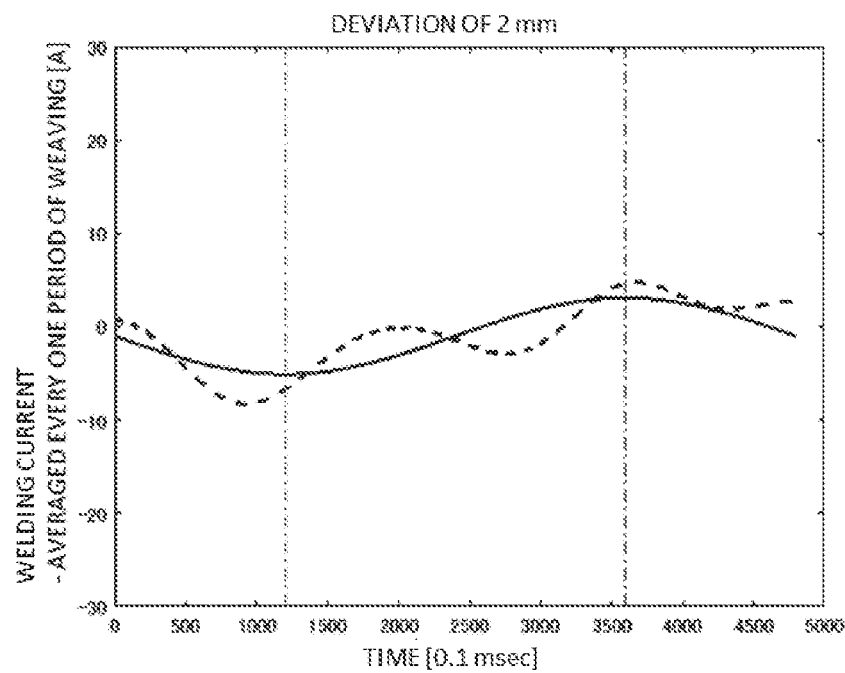
FIG. 2C is a graph illustrating a change in welding current when the deviation of the welding torch from the welding line is 2 mm during the welding of FIG. 1 (Example 1).
Figure 2D:
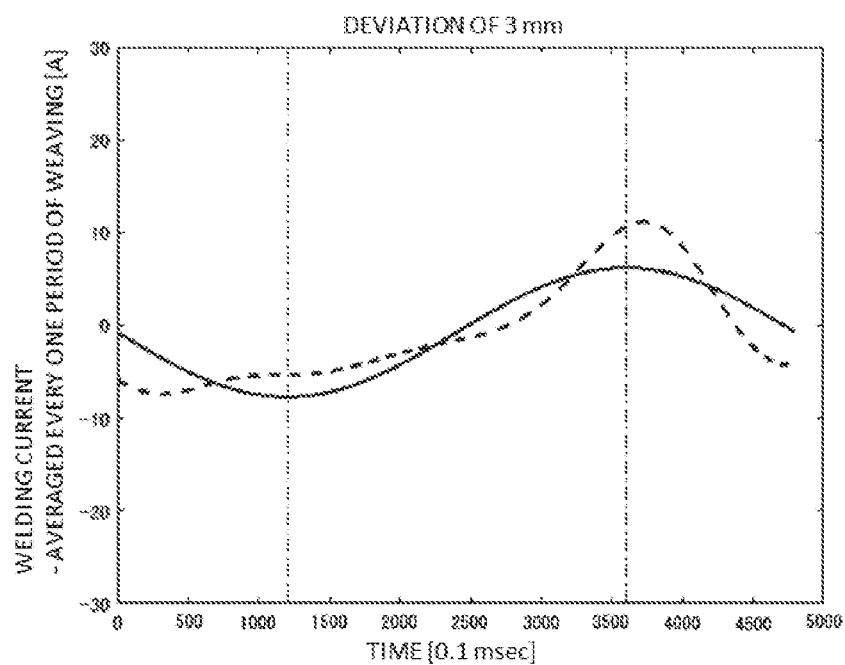
FIG. 2D is a graph illustrating a change in welding current when the deviation of the welding torch from the welding line is 3 mm during the welding of FIG. 1 (Example 1).
Figure 2E:
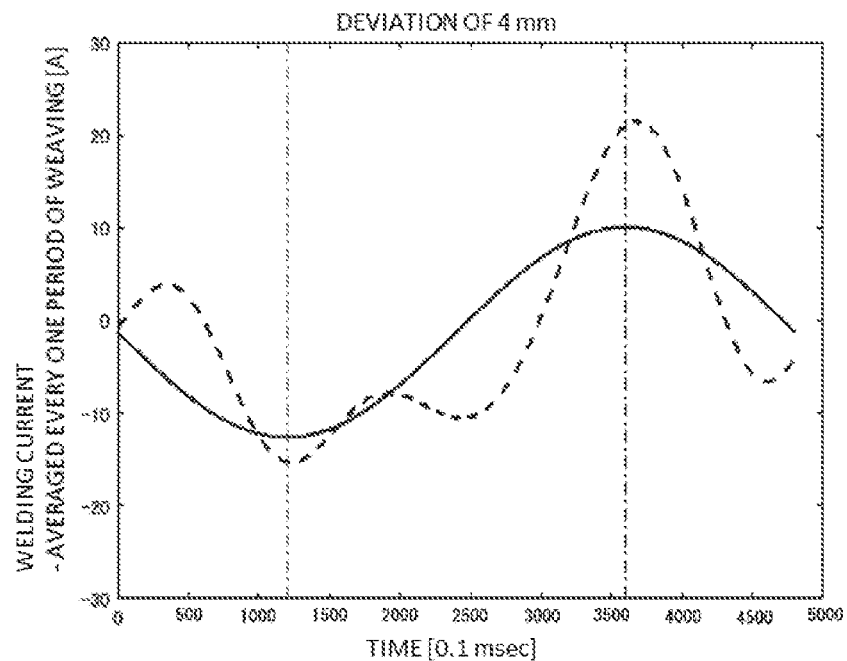
FIG. 2E is a graph illustrating a change in welding current when the deviation of the welding torch from the welding line is 4 mm during the welding of FIG. 1 (Example 1).

In particular, as schematically illustrated in FIG. 1, Expression (1) is applied to downward welding while changing the position of the welding torch 5 to deviations of 0 mm, 1 mm, 2 mm, 3 mm, and 4 mm from a welding line. Results of Expression (1) applied thus are shown in FIG. 2A to FIG. 2E.

Each of the broken lines in FIG. 2A to FIG. 2E shows a typical waveform selected from a waveform corresponding to 50 weaving cycles (50 periods of weaving) and depicted by the broken line. On the other hand, the solid line shows a result of fitting using a sine wave of Expression (1) as the function.

Figure 3A:
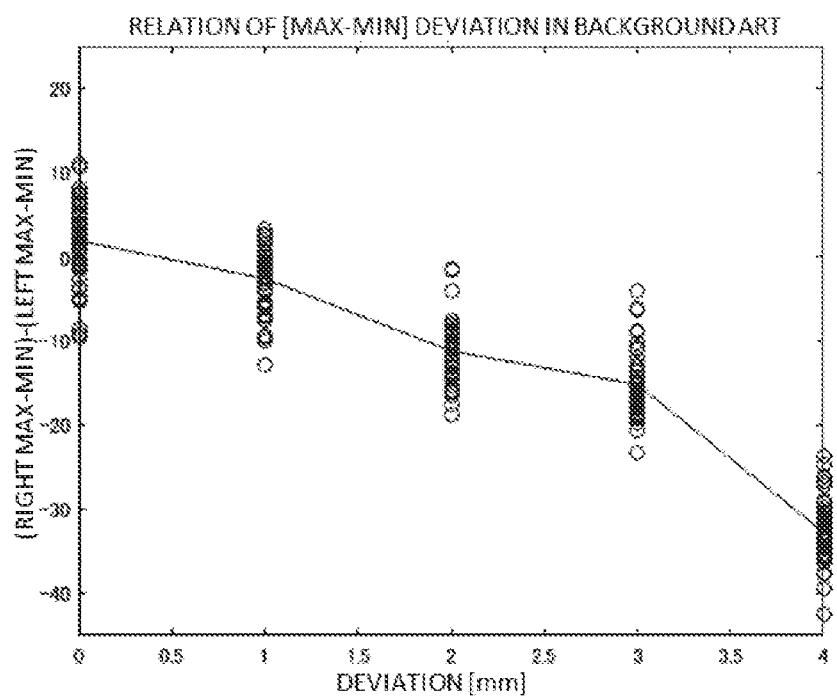
FIG. 3A is a graph illustrating a fluctuation in welding current with respect to a deviation of a welding torch from a welding line (Comparative Example).

In addition, the aforementioned left-right current difference is obtained for each welding current (welding current corresponding to one period) of welding currents corresponding to 50 weaving cycles in FIG. 2A to FIG. 2E, and deviations from the welding line are arranged for each set value of the deviation. Results of the deviations are shown in FIG. 3A. To say other words, FIG. 3A shows results of measuring deviations from a welding line in a background-art method, and the left-right distribution width expanded in the longitudinal axis direction in each deviation shows a measured left-right current difference, that is, a variation of amplitude.

Figure 3B:
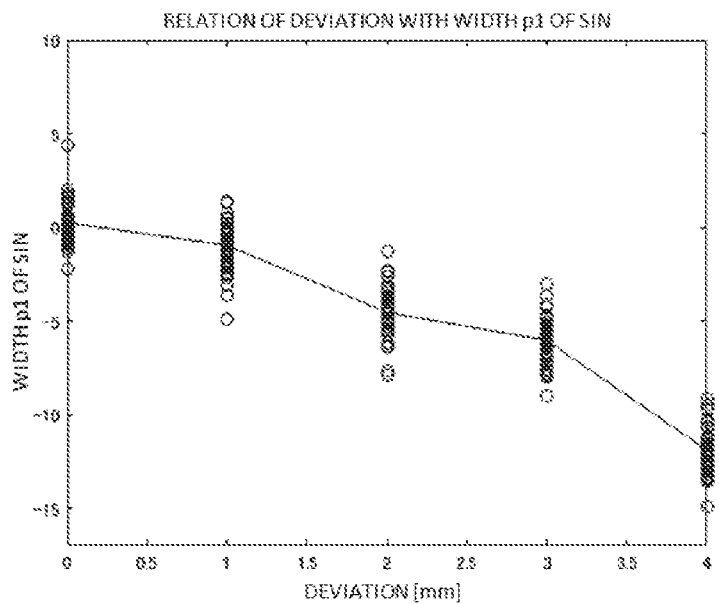
FIG. 3B is a graph illustrating a fluctuation (amplitude $p_1$) in welding current with respect to a deviation of a welding torch from a welding line (Example 1).

FIG. 3B shows results of amplitude $p_1$ of the function obtained by fitting using Expression (1) and arranged for each set value of the deviation from a welding line in the same manner. The distribution width of the amplitude $p_1$ expanded in the longitudinal axis direction in FIG. 3B shows a variation of amplitude measured in the method of Example 1.

FIG. 3A showing the left-right current difference measured in the aforementioned background-art method is compared with FIG. 3B showing the variation of the amplitude measured in the method of Example 1. For example, pay attention to values in a deviation of 0 mm and values in a deviation of 4 mm. It can be understood that the vertical width of the variation in the amplitude $p_1$ calculated in the method of Example 1 is smaller than that in the left-right current difference calculated in the background-art method (the amplitude obtained in the background-art method). It can be judged that the amplitude $p_1$, that is, the deviation from the welding line can be detected accurately.

From the above results, it can be understood that the accuracy of arc-tracking welding can be improved on a large scale when the arc-tracking welding is performed while the deviation from the welding line is detected in the method of Example 1. In addition, when the method of Example 1 is used for detecting the deviation, the accuracy of the deviation detected simply can be improved.

The aforementioned method of Example 1 is a method in which when a weaving waveform is fitted to a waveform of a welding current or a welding voltage, the fitting is carried out using data of the welding current or the welding voltage obtained for one period whenever the data for the one period are acquired.

In Example 1, fitting may be performed sequentially using data of the welding current corresponding to one period of weaving in the past from the current time whenever the data are obtained.

[Math 5]

In case of a section from 1 to $n$:

$$\begin{bmatrix} y(t_1) \\ y(t_2) \\ \vdots \\ y(t_n) \end{bmatrix} = \begin{bmatrix} \sin(t_1 + \phi) & 1 \\ \sin(t_2 + \phi) & 1 \\ \vdots & \vdots \\ \sin(t_n + \phi) & 1 \end{bmatrix} \times \begin{bmatrix} p_1 \\ p_2 \end{bmatrix} \quad (t_1 < t_2 < \ldots < t_n)$$

can be obtained by $P = (A^T \times A)^{-1} \times A^T \times B$ on the assumption $$B = A \times P$$

In case of a section from 2 to $n+1$:

$$\begin{bmatrix} y(t_2) \\ y(t_3) \\ \vdots \\ y(t_{n+1}) \end{bmatrix} = \begin{bmatrix} \sin(t_2 + \phi) & 1 \\ \sin(t_3 + \phi) & 1 \\ \vdots & \vdots \\ \sin(t_{n+1} + \phi) & 1 \end{bmatrix} \times \begin{bmatrix} p_1 \\ p_2 \end{bmatrix} \quad (t_2 < t_3 < \ldots < t_{n+1})$$

can be obtained by $P = (A^T \times A)^{-1} \times A^T \times B$ on the assumption $$B = A \times P$$

In this manner, $p_1$ and $p_2$ can be obtained sequentially using data for past one period every time when data are acquired. By this manner, the deviation can be obtained every time when data are acquired, and the deviation can be obtained earlier without waiting for the next weaving period. In addition, there is a merit that the deviation can be obtained continuously.

Further, in Example 1, fitting operation may be performed every time when data of the welding current or the welding voltage are acquired (successive fitting).

In the successive fitting, that is, the successive least-squares method, influence of the past is carried slightly, but there is a merit that the calculation amount can be made very small.

When estimation is performed based on the successive fitting, Expression (4) may be used.

[Math 6]

$$K_i = \frac{M_1 \times A(i,:)}{\lambda + A(i,:)^T \times M_1 \times A(i,:)} \quad (4)$$

$$M_i = \frac{(M_{i-1} - K_i \times A(i,:)^T \times M_{i-1})}{\lambda}$$

$$P'_i = P'_{i-1} - K_i \times (A(i,:) \times P'_{i-1} - B(i,:))$$

Here, P'i designates an estimated value of $[p_1, p_2]$T in the $i^{th}$ successive calculation. In addition, A(i, :) designates the vector of the A matrix, and in the same manner B(i, :) designates the vector of the B matrix. In addition, λ designates a forgetting coefficient.

By use of the successive fitting manner, results substantially similar to those of FIG. 2A to FIG. 2E and FIG. 3B can be obtained.

Example 2

Figure 4:
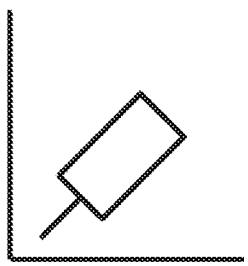
FIG. 4 is an explanatory diagram schematically illustrating horizontal fillet welding.

In Example 2, fitting using a least-squares method with a trigonometric function as a function is performed on a horizontal fillet schematically illustrated in FIG. 4, so as to detect a deviation from a welding line.

A sine waveform (Sin waveform) having a period equal to the weaving period and a sine waveform having a period equal to half the weaving period are used and combined as the function of Example 2.

Specifically, in Example 2, fitting is performed based on y(t) obtained every one period of weaving, so as to obtain amplitudes $p_1$, $p_2$ and $p_3$ in Expression (5). In the function of Example 2 shown by Expression (5), the sine waveform is set to have a phase difference of 0, while the sine waveform having half the period is set to have a phase difference of π/2. The reason why the phase difference of π/2 is provided thus is to match a peak of the sine wave having half the period with a position of an end signal of weaving.

That is, in Example 2, the amplitudes $p_1$, $p_2$ and $p_3$ obtained for each weaving period are processed by the least-squares method in the same manner as in Example 1, so that the amplitude $p_1$ after fitting can be obtained.

[Math 7]

$$y(t) = p_1 \times \sin(t) + p_2 \times \sin\left(2t + \frac{\pi}{2}\right) + p_3 \quad (5)$$

Even when fitting is performed on the welding current in the horizontal fillet welding as shown in FIG. 4, the coefficient $p_1$ in the function with no deviation does not coincide with 0 perfectly. This is caused by the influence of gravitation or the angle of the torch. A similar result appears in amplitude calculation using a left-right current difference performed in the background art. In such a case, according to the background-art method, control is made with a function including an offset current A added to tracking parameters. That is, control to set the left-right current difference=(IL1−IL2)−(IR1−IR2)+A to "0" is performed in the aforementioned case. Therefore, also in Example 2, a similar offset parameter is provided to control tracking welding.

Figure 5A:
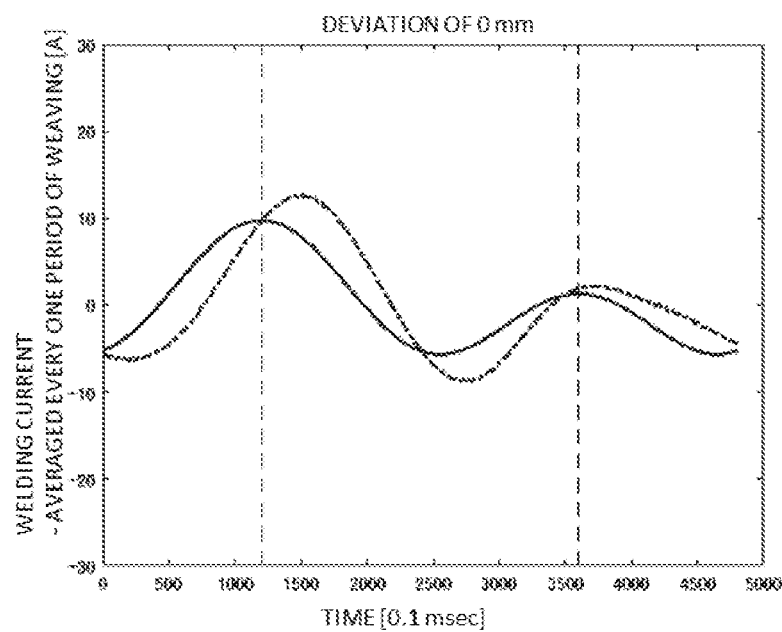
FIG. 5A is a graph illustrating a change in welding current when there is no deviation of a welding torch from a welding line during the welding of FIG. 4 (Example 2).
Figure 5B:
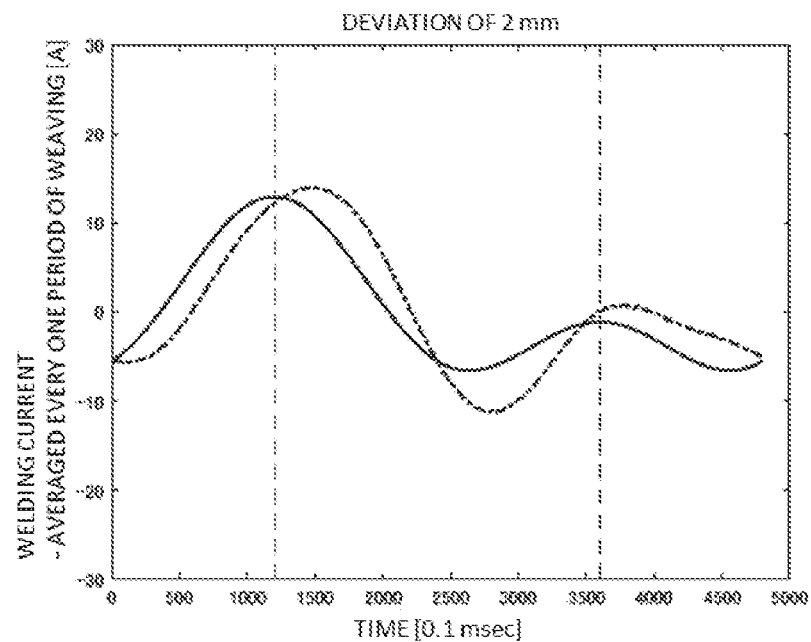
FIG. 5B is a graph illustrating a change in welding current when the deviation of the welding torch from the welding line is 2 mm during the welding of FIG. 4 (Example 2).
Figure 5C:
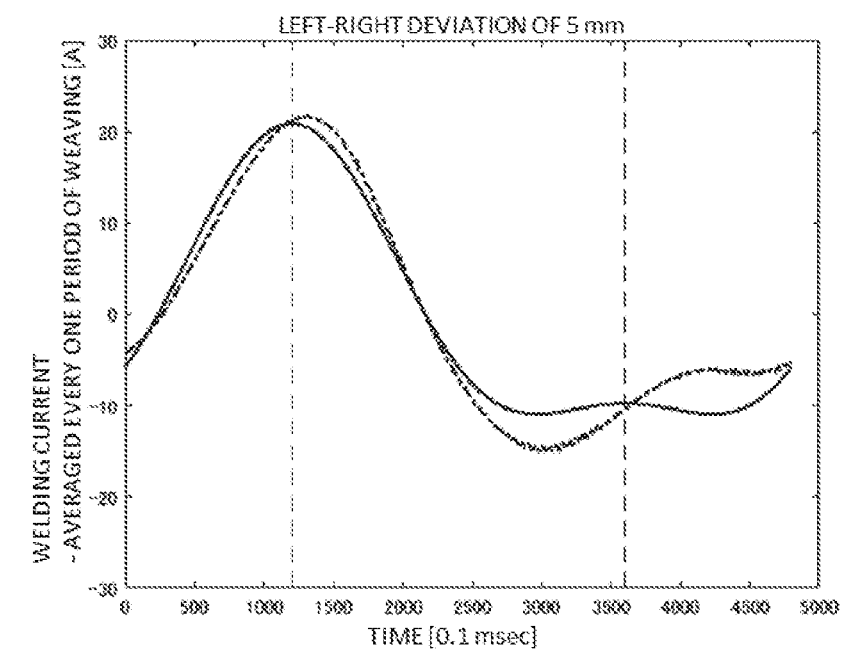
FIG. 5C is a graph illustrating a change in welding current when the deviation of the welding torch from the welding line is 5 mm during the welding of FIG. 4 (Example 2).

A deviation from a welding line is obtained by this method in FIG. 5A to FIG. 5C. The obtained deviation is compared with that in the background-art method in FIG. 6A and FIG. 6B.

That is, each of the broken lines in FIG. 5A to FIG. 5C, shows a typical waveform selected from a waveform corresponding to 50 weaving cycles (50 periods of weaving) and depicted by the broken line. On the other hand, the solid line shows a result of fitting using a sine wave of Expression (1) as the function.

In addition, the aforementioned left-right current difference is obtained for each welding current (welding current corresponding to one period) of welding currents corresponding to 50 weaving cycles, and deviations from the welding line are arranged for each set value of the deviation. Results of the deviations are shown in FIG. 6A (background-art method).

Figure 6A:
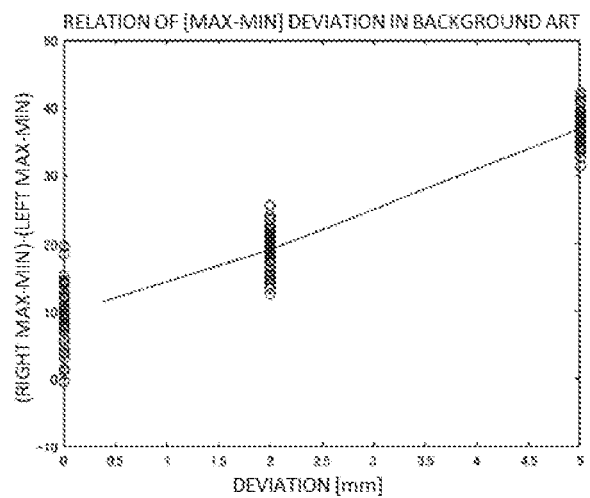
FIG. 6A is a graph illustrating a fluctuation in welding current with respect to a deviation of a welding torch from a welding line (Comparative Example).
Figure 6B:
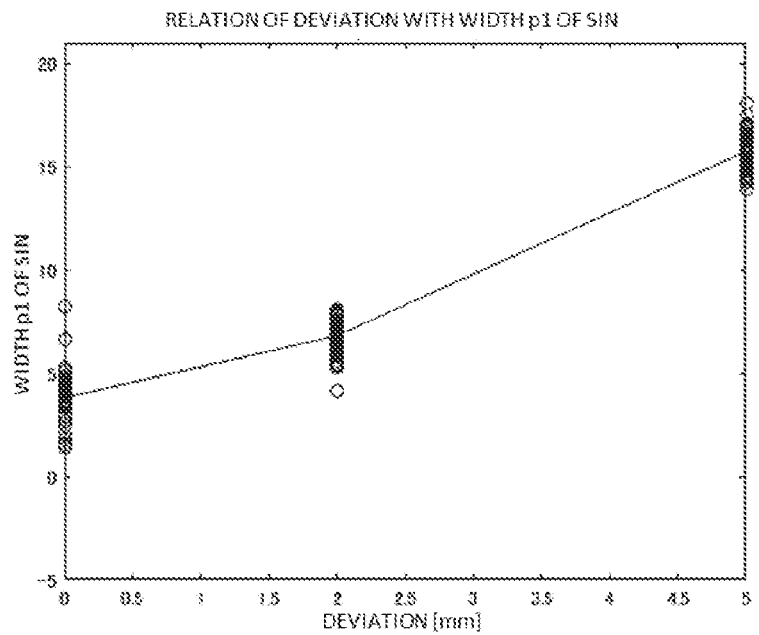
FIG. 6B is a graph illustrating a fluctuation (amplitude $p_1$) in welding current with respect to a deviation of a welding torch from a welding line (Example 2).

FIG. 6B shows results of amplitude $p_1$ of the function obtained by fitting using Expression (1) and arranged for each set value of the deviation from a welding line in the same manner. The distribution width of the amplitude $p_1$ expanded in the longitudinal axis direction in FIG. 6B shows a variation of amplitude measured in the method of Example 1 in the same manner as in FIG. 3B.

The results of FIG. 6A are compared with the results of FIG. 6B. From the results in the case of a deviation of 2 mm, it can be understood that the size of the variation in the amplitude $p_1$ calculated in the method of Example 2 is smaller than that in the left-right current difference (the amplitude obtained in the background-art method).

In addition, it is understood that an original waveform of a welding current can be reproduced substantially when fitting is performed on the original waveform with amplitude or the like obtained by the least-squares method using a sine waveform having a period equal to the weaving period and a sine waveform having a period equal to half the weaving period as the function. It is obvious that the fitting can be applied to reduction of a memory for accumulating data when current waveforms or voltage waveforms are accumulated in a control device or a personal computer so that the waveforms can be checked later or traceability can be secured, as performed recently. That is, each current waveform or voltage waveform is not accumulated directly as sampling data, but fitting is once performed thereon to store the waveform in a format of $p_1$, $p_2$ and $p_3$. In this manner, the volume of the memory such as a hard disk can be reduced on a large scale without losing amplitude information of the waveform. Thus, the cost can be reduced.

Particularly as is apparent from FIG. 6B, due to reduction of variation, the accuracy can be improved on a large scale.

Example 3

In Example 3, a trigonometric function such as a sine waveform or a cosine waveform is not used as the function, but a non-trigonometric function is used for fitting. Specifically, the weaving waveform in Example 3 is "Sin+stop at both ends" shown on the left side of FIG. 7, and the "Sin+stop at both ends" shown on the left side of FIG. 7 is used as the function for fitting.

Figure 8A:
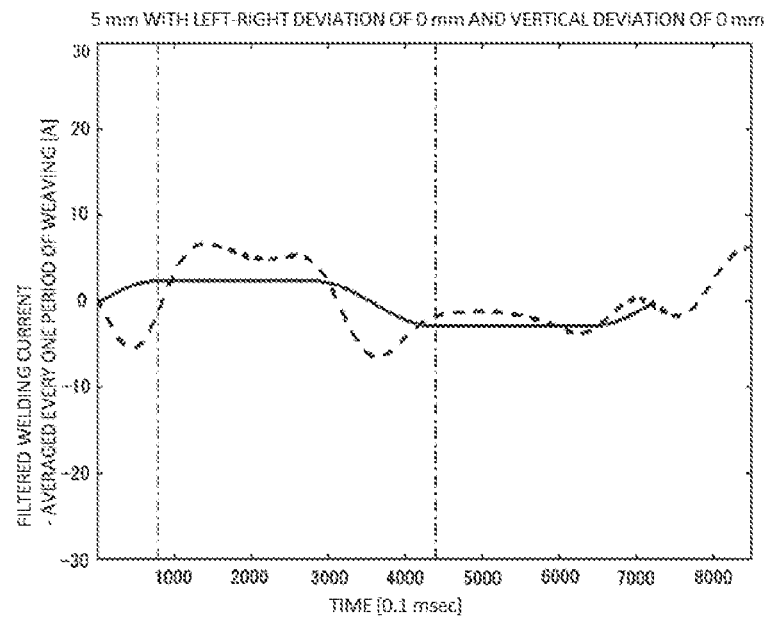
FIG. 8A is a graph illustrating a change in welding current when there is no deviation of a welding torch from a welding line (Example 3).
Figure 8B:
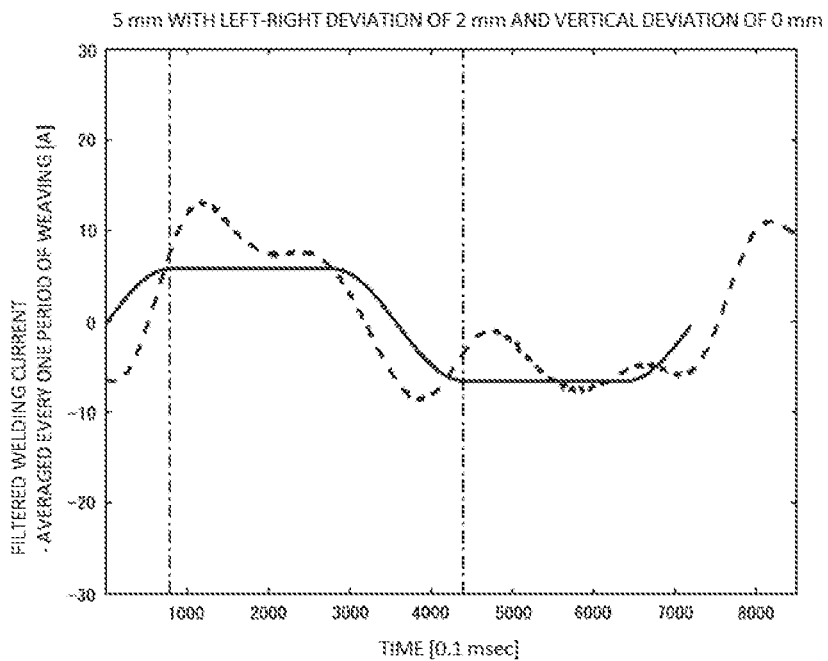
FIG. 8B is a graph illustrating a change in welding current when the deviation of the welding torch from the welding line is 2 mm (Example 3).
Figure 8C:
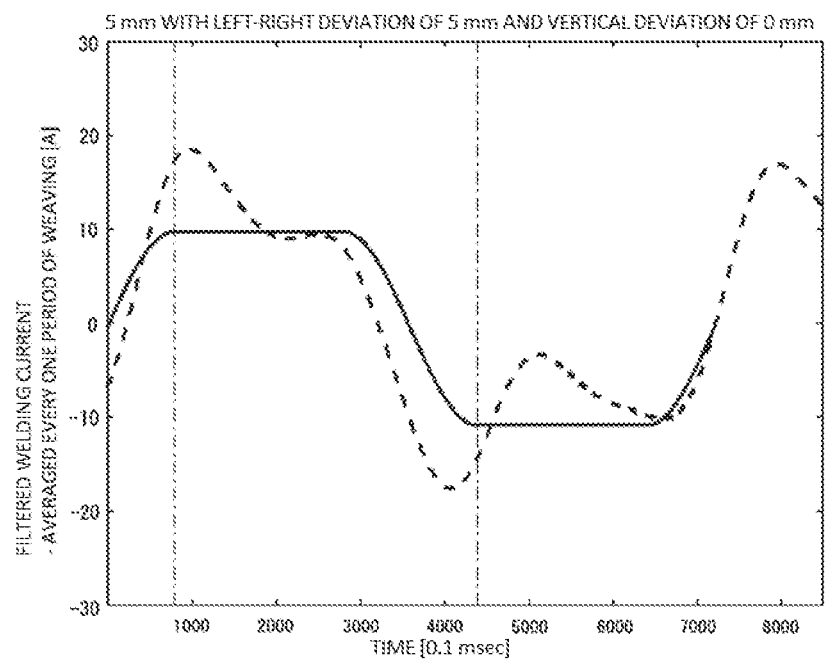
FIG. 8C is a graph illustrating a change in welding current when the deviation of the welding torch from the welding line is 5 mm (Example 3).

As shown in FIG. 8A to FIG. 8C, in the case where the deviation from a welding line is set at 0 mm, 2 mm and 5 mm in the same manner as in Example 1 or Example 2, it is understood that an original waveform of the welding current can be reproduced substantially when fitting is performed on the original waveform using a non-trigonometric function as the function.

Figure 8D:
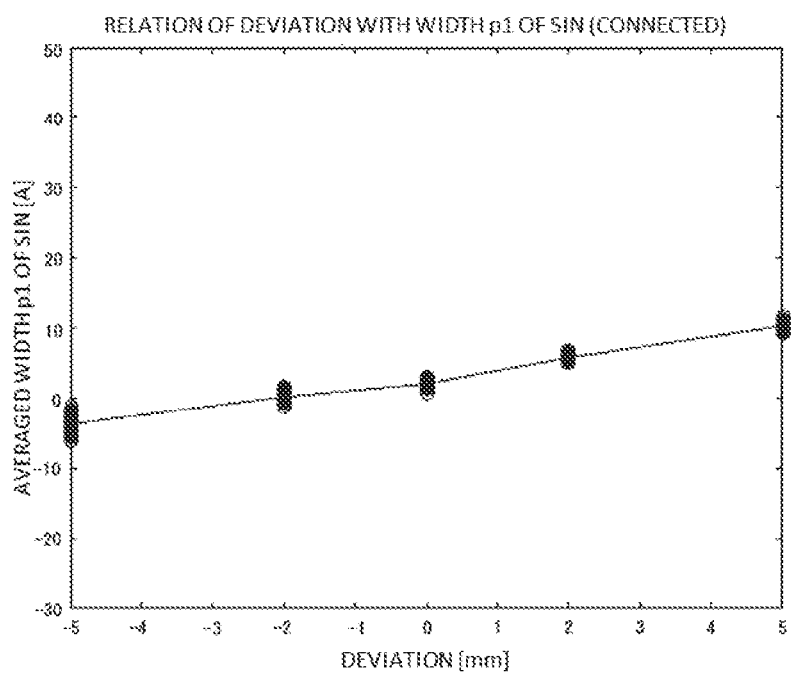
FIG. 8D is a graph illustrating a fluctuation (amplitude $p_1$) in welding current with respect to the deviation of the welding torch from the welding line (Example 3).

In addition, as is apparent from FIG. 8D, when fitting of Example 3 is performed, in the same manner as in Example 1 or Example 2, it is judged that the variation can be reduced more largely than that of amplitude obtained in the background-art method, so that the accuracy can be largely improved in the calculation of the deviation from the welding line.

As described above in Example 1 to Example 3, a weaving waveform expressed by a function including a trigonometric function or a non-trigonometric function is fitted to a waveform of a welding current or a welding voltage, and a deviation in arc-tracking welding is detected based on amplitude of the fitted waveform. Thus, the deviation from a welding line can be detected accurately.

Example 4

Example 4 discloses a technique in which, when fitting is sequentially performed following the method of each of the aforementioned examples (Examples 1 to 3), results of the sequential fitting are averaged every one period of weaving, so that the accuracy can be more improved than when fining is performed simply every one period of weaving.

Figure 10:
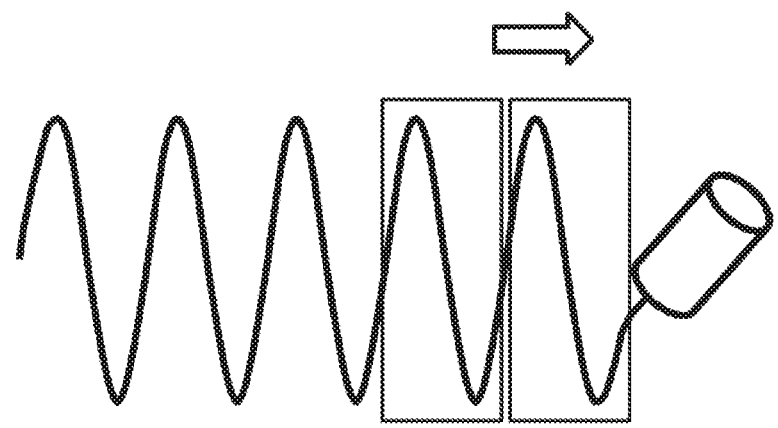
FIG. 10 is an explanatory diagram schematically illustrating fitting performed only once every one weaving period.
Figure 11:
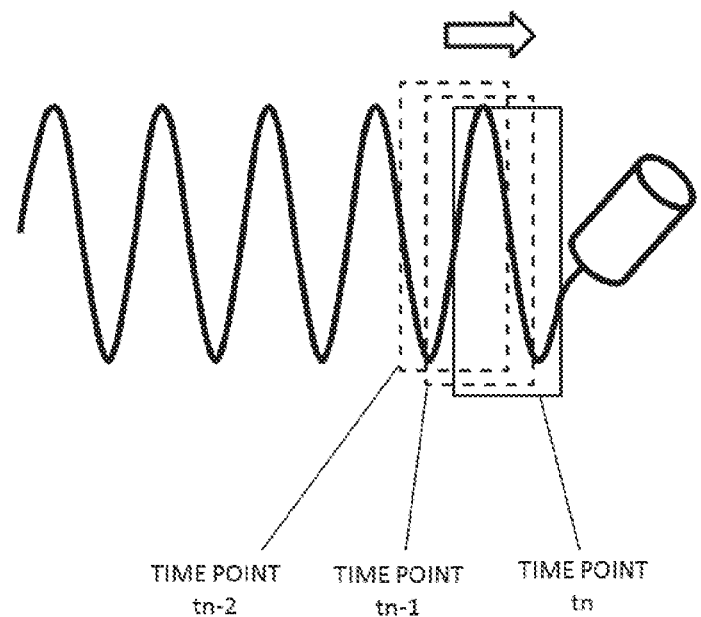
FIG. 11 is an explanatory diagram schematically illustrating sequential fitting while averaging results of the sequential fitting every one weaving period.

FIG. 10 schematically illustrates a case where fitting is performed simply every one period of weaving. On the other hand, FIG. 11 schematically illustrates a technique (technique of Example 4) in which sequential fitting is performed while results of the sequential fitting are averaged every one period of weaving.

That is, in the technique of Example 4, sequential fitting is performed while calculation is performed to average results of the sequential fitting every one period of weaving. A specific method of the calculation is described below.

When sequential fitting is performed in a section from 1 to n, $p_1(tn)$ is obtained as follows.

[Math 8]

$$\begin{bmatrix} y(t_1) \\ y(t_2) \\ \vdots \\ y(t_n) \end{bmatrix} = \begin{bmatrix} \sin(t_1 + \phi) & 1 \\ \sin(t_2 + \phi) & 1 \\ \vdots & \vdots \\ \sin(t_n + \phi) & 1 \end{bmatrix} \times \begin{bmatrix} p_1(t_n) \\ p_2(t_n) \end{bmatrix} \quad (t_1 < t_2 < \ldots < t_n)$$

can be obtained by $P=(A^T \times A)^{-1} \times A^T \times B$ on the assumption:

$B = A \times P$

When sequential fitting is performed in a section from 2 to n+1, $p_1(tn+1)$ is obtained as follows.

[Math 9]

$$\begin{bmatrix} y(t_2) \\ y(t_3) \\ \vdots \\ y(t_{n+1}) \end{bmatrix} = \begin{bmatrix} \sin(t_2 + \phi) & 1 \\ \sin(t_3 + \phi) & 1 \\ \vdots & \vdots \\ \sin(t_{n+1} + \phi) & 1 \end{bmatrix} \times \begin{bmatrix} p_1(t_{n+1}) \\ p_2(t_{n+1}) \end{bmatrix} \quad (t_2 < t_3 < \ldots < t_{n+1})$$

can be obtained by $P=(A^T \times A)^{-1} \times A^T \times B$ on the assumption:

$B = A \times P$

In this manner, whenever data is acquired, fitting is performed using data corresponding to one period in the past while sliding a window (section), so as to obtain $p_1(tn)$ and $p_1(tn+1)$ sequentially.

Assume that a time point advancing from a time point to by one period of weaving is tn+(n−1). In this case, an average of results of sequential fitting can be obtained as:

$$p_{Ave} = \{p_1(tn) + p_1(tn+1) + \ldots + p_1(tn+(n-1))\}/n \quad (7)$$

Figure 12A:
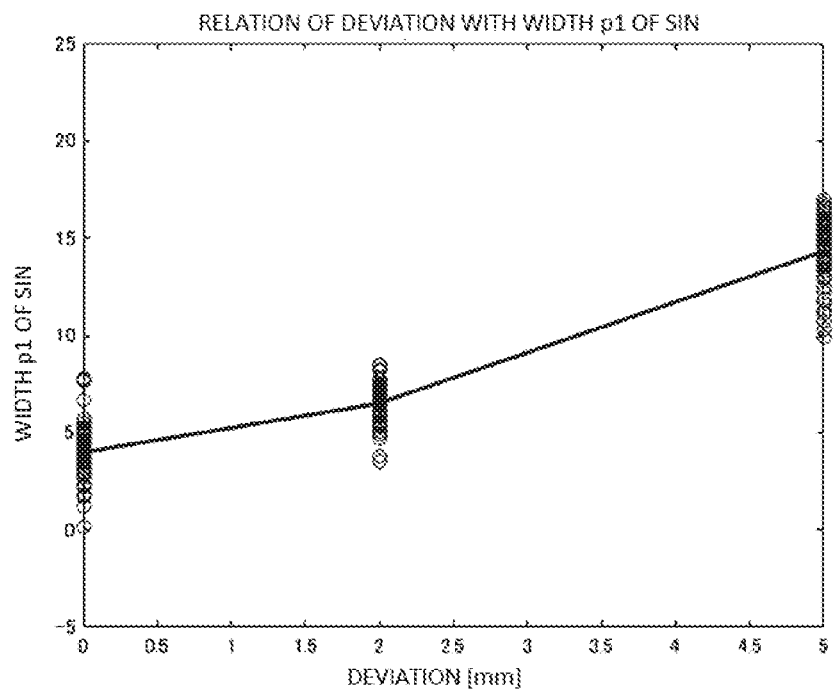
FIG. 12A is a graph illustrating results of fitting performed in a manner of Example 1.
Figure 12B:
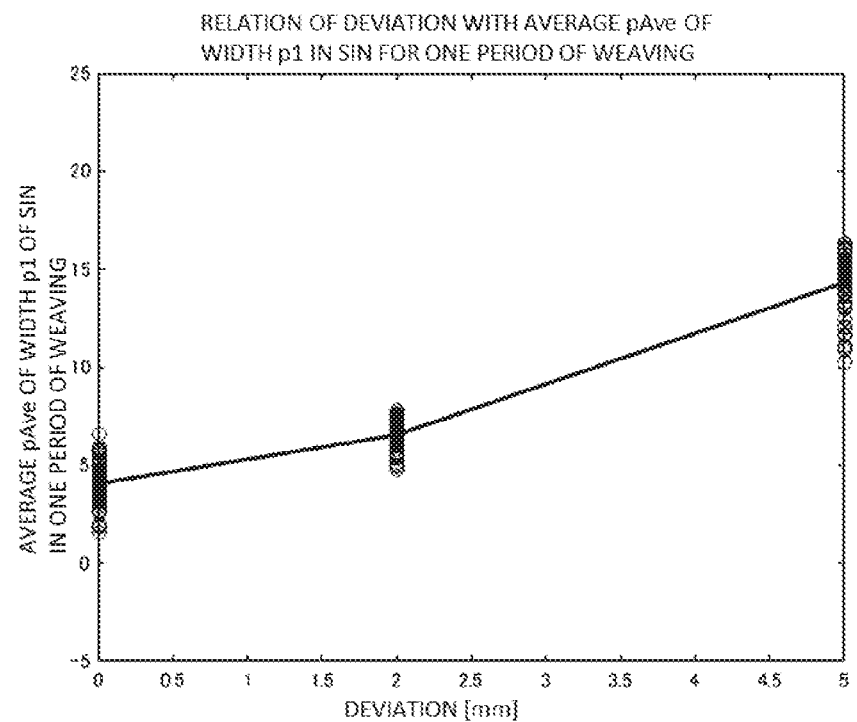
FIG. 12B is a graph illustrating results of fitting performed in a manner of Example 4.

FIG. 12A shows results of fitting using Expression (1) to obtain amplitude $p_1$ of the function and arrange the obtained amplitude $p_1$ for each set value of the deviation from the welding line. FIG. 12B shows results of fitting using Expression (6) to obtain amplitudes $p_1(tn)$ to $p_1(tn+(n-1))$ of the function, obtain average amplitude $p_{Ave}$ thereof by Expression (7), and arrange the obtained amplitude for each set value of the deviation from the welding line.

FIG. 12A is compared with FIG. 12B showing a variation of amplitude measured in the method of Example 4.

For example, pay attention to values in a deviation of 0 mm, values in a deviation of 2 mm, and values in a deviation of 5 mm.

It can be understood that the vertical width of the amplitude $p_{Ave}$ calculated in the method of Example 4 is smaller than that of $p_1$ calculated simply every one period of weaving, and it can be judged that the amplitude $p_{Ave}$, that is, the deviation from the welding line can be detected accurately. Here, sequential fitting has been described. However, not to say, averaging can be performed in successive fitting in the same manner.

When the number of times of sequential fitting in each one period of weaving is increased, it takes much time for processing accordingly. Examples about how many times to perform sequential fitting every one period of weaving is shown below.

Figure 13A:
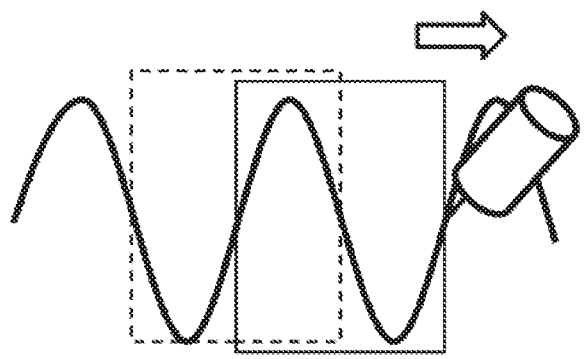
FIG. 13A is an explanatory diagram schematically illustrating sequential fitting performed twice every one weaving period.
Figure 13B:
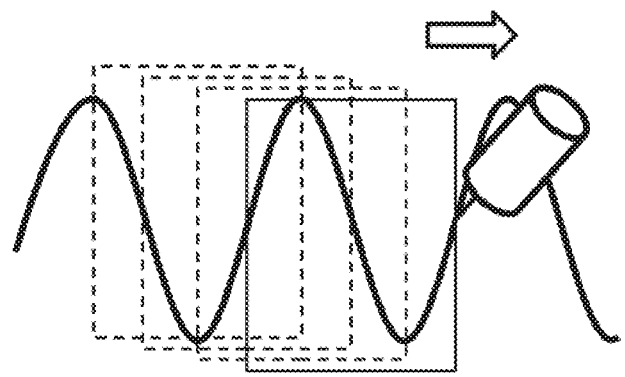
FIG. 13B is an explanatory diagram schematically illustrating sequential fitting performed four times every one weaving period.
Figure 13C:
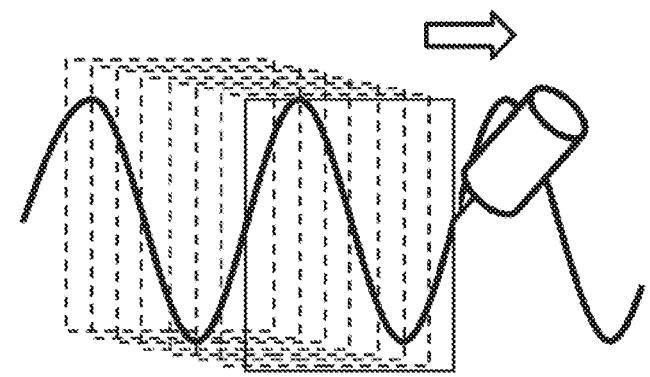
FIG. 13C is an explanatory diagram schematically illustrating sequential fitting performed eight times every one weaving period.

FIG. 13A to FIG. 13C schematically show how many times to perform sequential fitting every one period of weaving. FIG. 13A shows an example in which the number of sliding windows is two, that is, calculation is performed while a section is slid only once. Similarly, FIG. 13B shows an example in which the number of sliding windows is four, that is, calculation is performed while a section is slid three times. FIG. 13C shows an example in which the number of sliding windows is eight, that is, calculation is performed while a section is slid seven tunes.

When results of sequential fitting is averaged while changing the number of times of the sequential fitting every one period of weaving in this manner, the welding accuracy in tracking welding is improved. On the other hand, the processing time increases.

Figure 14:
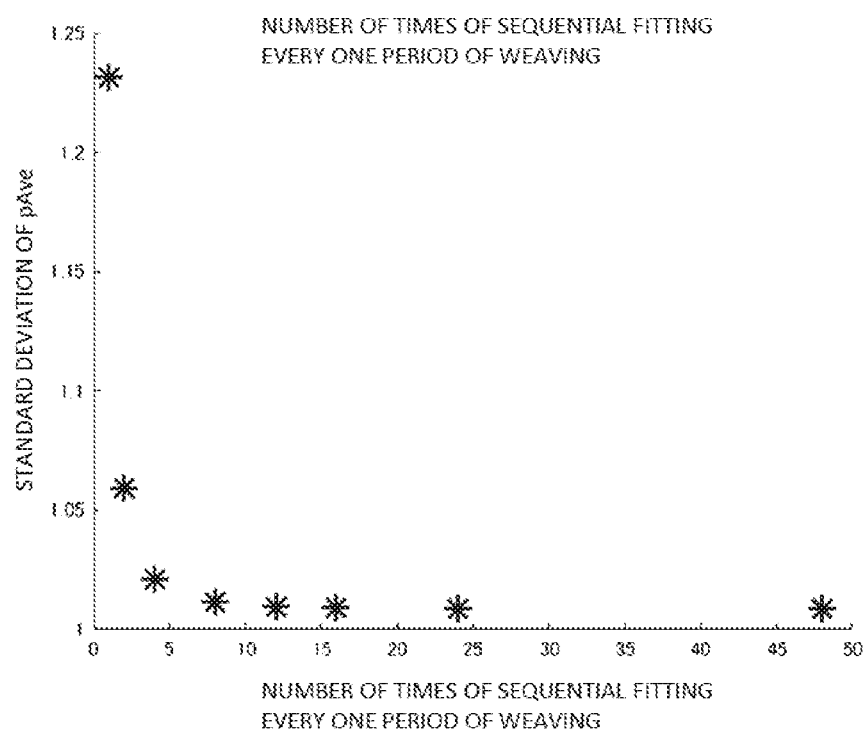
FIG. 14 is a graph illustrating a relation between the number of times of sequential fitting and a standard deviation of an average $p_{ave}$.

FIG. 14 shows a relation between the number of times of sequential fitting every one period of weaving and a standard deviation of an average $p_{Ave}$ of results of the sequential fitting every one period of weaving when the number of times of the sequential fitting is changed as shown in FIG. 13A to FIG. 13C.

As is apparent from FIG. 14, the standard deviation of $P_{Ave}$ decreases largely when the number of times of sequential fitting every one period of weaving is about 2 to 8. Accordingly, it is judged that due to the processing (where the number of times of sequential fitting is limited to about eight) of Example 4, it is possible to reduce a variation of amplitude without increasing the processing time on a large scale, that is, the deviation from the welding line can be detected more accurately.

As described above, in Example 4, results of sequential fitting are averaged every one period of weaving, so that tracking welding can be attained with higher accuracy.

The embodiments disclosed herein should be considered not as restrictive but as exemplary in any respect. Particularly, values which are not out of ranges normally used by those skilled in the art but can be estimated easily by those skilled in the art are used as items which have not been suggested clearly in the embodiments disclosed herein, such as running conditions or operating conditions, various parameters, dimensions, weights and volumes of constituents, etc. For example, even in a case of weaving for swinging obliquely with respect to a welding direction, fitting to a function having a period equal to the period of the weaving may be performed. Thus, the deviation can be detected in the same manner.

The present application is based on Japanese Patent Application No. 2016-223233 filed on Nov. 16, 2016, and Japanese Patent Application No. 2017-174918 filed on Sep. 12, 2017, the disclosures of which are incorporated herein by reference.

DESCRIPTION OF REFERENCE NUMERALS AND SIGNS 1 welding robot
2 teaching pendant
3 control device
4 base material
5 welding torch
6 welding wire
7 welding power source

The invention claimed is:

1. A method for detecting a deviation in arc-tracking welding, in which a deviation between a welding line and an actual welding position is detected in arc-tracking welding for performing welding tracking the welding line while performing a weaving operation of swinging a welding torch with respect to a welding direction, the method comprising fitting a waveform expressed by a function repeated periodically in a period equal to a weaving period to a waveform of a welding current or a welding voltage and detecting a deviation in arc-tracking welding based on a fitted waveform, wherein in fitting the waveform expressed by the function is fitted to the waveform of the welding current or the welding voltage, sequential fitting is performed using, of acquired pieces of data of the welding current or the welding voltage, each piece corresponding to one past weaving period whenever the pieces of data are acquired; and calculating an average of results of the sequential fitting every predetermined period of time while the sequential fitting is performed.

2. The method for detecting a deviation in arc-tracking welding according to claim 1, wherein as the waveform expressed by the function, at least one of a sine wave and a cosine wave having a period equal to the weaving period is used.

3. The method for detecting a deviation in arc-tracking welding according to claim 1, wherein as the waveform expressed by the function, at least one of a sine wave and a cosine wave having a period equal to the weaving period is used and at least one of a sine wave and a cosine wave having a period equal to half the weaving period is used.

4. The method for detecting a deviation in arc-tracking welding according to claim 1, wherein as the waveform expressed by the function, a weaving waveform is used.

5. The method for detecting a deviation in arc-tracking welding according to claim 1, wherein in fitting the waveform expressed by the function to the waveform of the welding current or the welding voltage, acquired data of the welding current or the welding voltage is accumulated in a predetermined period of time and fitting is performed using the accumulated data of the welding current or the welding voltage.

6. The method for detecting a deviation in arc-tracking welding according to claim 1, wherein in fitting the waveform expressed by the function to the waveform of the welding current or the welding voltage, successive fitting is performed using each acquired piece of data of the welding current or the welding voltage whenever the piece of data is acquired.

* * * * *